Figure 1:
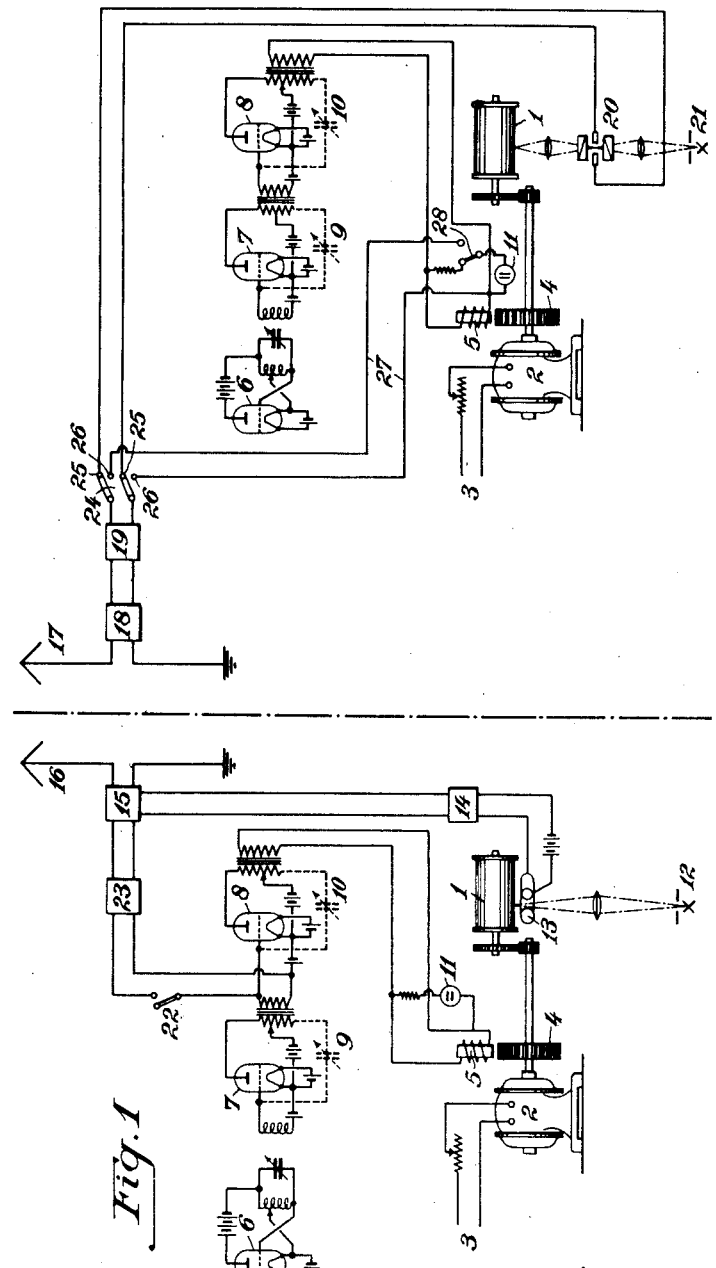

Oct. 8, 1929.  A. KAROLUS  1,730,772
PICTURE TELEGRAPHY
Filed Jan. 6, 1927  4 Sheets-Sheet 2

Inventor
August Karolus
by Knight Bro
attorneys

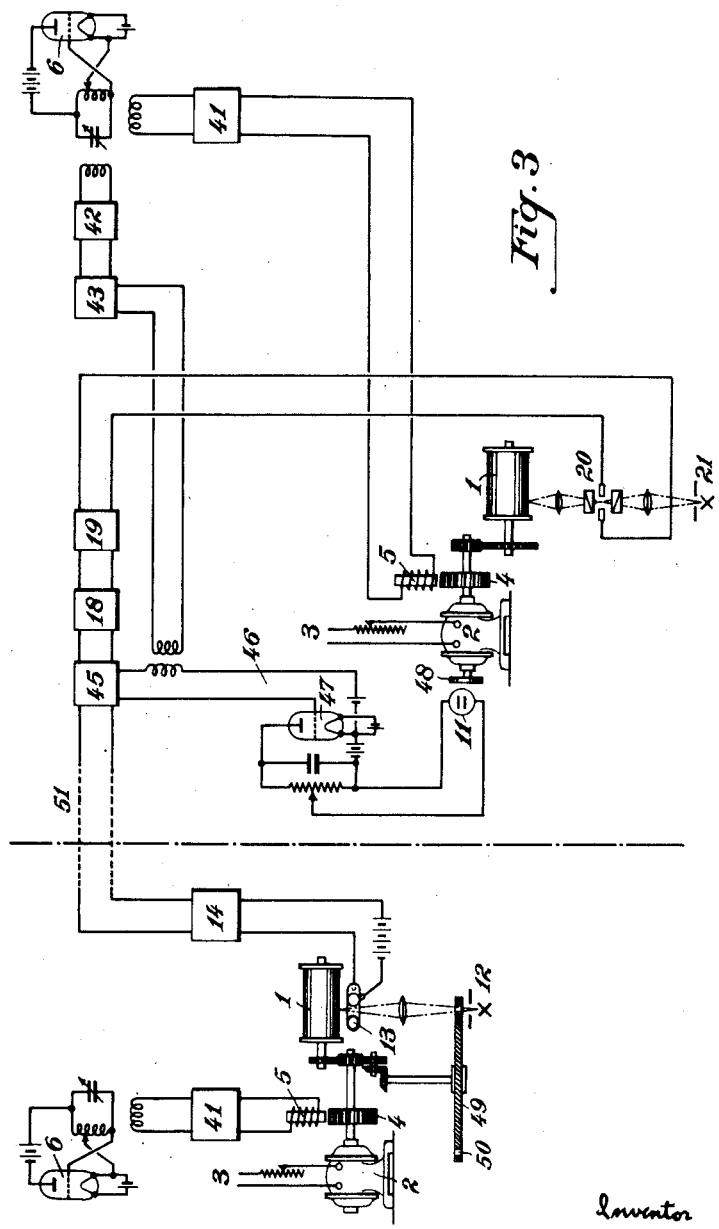

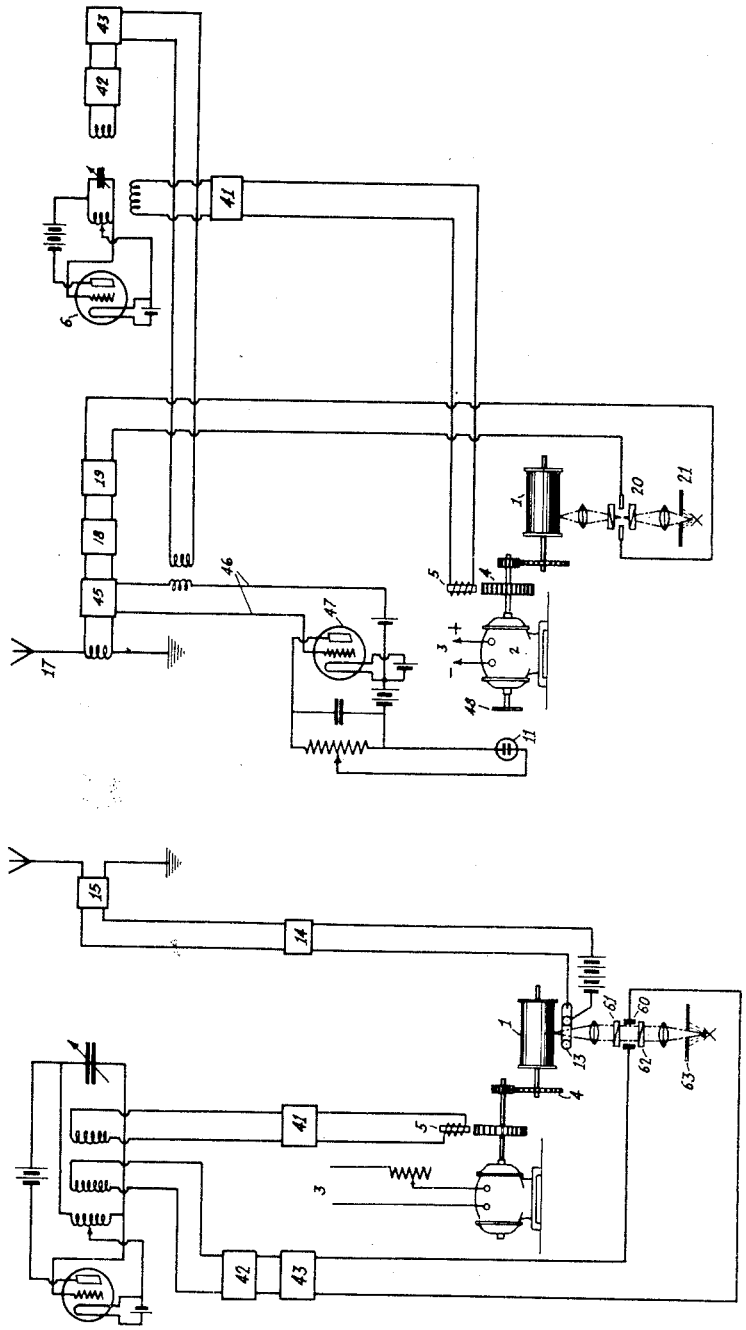

Patented Oct. 8, 1929

1,730,772

UNITED STATES PATENT OFFICE

AUGUST KAROLUS, OF LEIPZIG, GERMANY, ASSIGNOR TO RADIO CORPORATION OF AMERICA, A CORPORATION OF DELAWARE

PICTURE TELEGRAPHY

Application filed January 6, 1927, Serial No. 159,404, and in Germany January 18, 1926.

The invention relates to the maintenance of synchronism of the driving arrangements or other moving parts of apparatus for high speed telegraphy, transmission of pictures, television and the like without requiring the sending of special auxiliary impulses or frequencies by the same sending means. The invention is applicable for wireless transmission as for line transmission.

The invention is based on the fact that a very great increase in transmission speed is possible in the novel picture telegraphic transmission, or high speed telegraphic systems using inertia free translation impulse sending and receiver writing means, particularly however by the use of the Kerr cell as modified by Karolus, as a receiving light control apparatus. It is further known that the constancy of local generators is generally greater over short periods than over long periods of time.

The invention consist essentially in that driving motors are provided for the sending and receiving apparatus fed by special sources of energy at the sending and receiving places, the speed of revolution of which is controlled or maintained constant by means of special electrical oscillation generators namely thermionic tube generators, the frequency of which can be precisely controlled.

The thermionic tube generators preferably serve to feed synchronous motors, La Cour wheels, or the like, which in turn are coupled with the driving motors, the speed of revolution of which is to be maintained constant. The driving motors themselves need not be regulated to absolute synchronism as the maintenance of synchronism of their revolution takes place from the thermionic tubes acting as contact impulse givers to the motors.

The two independent oscillation generators at sending and receiving stations need in this arrangement only to provide the load necessary for the control of the driving motor which is only an insignificant part of the complete motor load necessary for the apparatus. The generators are preferably tuned to similar frequencies and the simplest method of synchronism control is by connection of one or both frequencies. Alternatively it is of course possible to apply a phase correction, whereby any angular error of either frequency is estimated and corrected.

In the case of thermionic tube generators, by maintaining carefully constant the heating current voltage, anode voltage, grid charge control, by the use of coils without iron, and by maintaining a constant temperature for the parts of the tuned circuit and so forth, an accuracy of the order of one in 100,000 and over can be obtained and thereby provide for the working requirements even in the case of high output with synchronous running and with freedom from distortion.

The invention further provides means whereby the frequencies of the two independent thermionic tube generators can initially be brought into agreement, and whereby this agreement may from time to time, or constantly be checked in order to secure an absolute constancy of frequency.

For this purpose the frequency of one generator is transmitted to the opposite station and is there compared with the frequency of the other generator, or the frequencies of both generators are locally independently compared with a third particularly constant master frequency emitter, for instance a master pendulum, and then if necessary brought into agreement or permanently and constantly maintained in agreement.

It has been found to be particularly desirable to use the high frequency carrier wave current for the telegraphic signs or picture light values as a synchronizer or phase maintainer in the sense of this invention, or again to use the thermionic tube generator producing these waves, for this purpose.

Several forms of construction are shown by way of example in the accompanying drawings by wiring diagrams.

In these, Figure 1 shows a sender and receiver for a wireless transmission of pictures with thermionic tube generators for the synchronizing and control arrangements of their frequencies by the transmission of the frequency from sending to receiving station.

Figure 2:
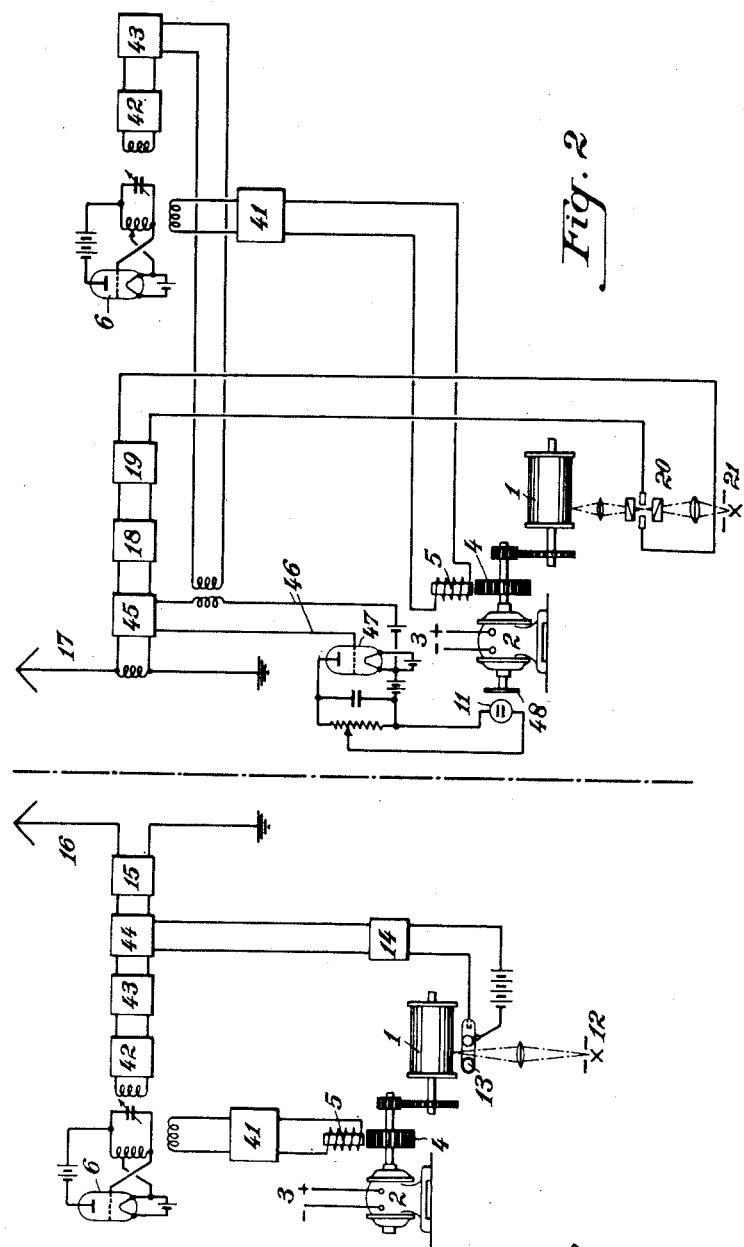

Figure 2 shows a sending and receiving station for wireless transmission of pictures and the use of a drive oscillator for the picture transmitter to synchronize the auxiliary frequency control arrangement; Figure 3 shows a sending and receiver station in an arrangement for the line sending of pictures, in which the carrier waves are produced by the interruption of the translation light ray in direct dependence upon the frequency of the synchronizing generator; and, Fig. 4 is an arrangement similar to Figs. 3 and 4 showing a sending and receiving station in which the carrier waves are produced by the interruption of lights passing through a Kerr cell in direct dependence upon the frequency of the synchronizing generator.

In Figure 1 the sending station is shown at the left, whilst the receiving station of a wireless picture transmission arrangement is shown on the right. In both cases the main load of driving the picture drum 1 is taken by a main motor 2 fed from an independent source over leads 3, and which may for instance be a direct current motor. This motor can be coarsely controlled so that both drums are driven at approximately the speed desired for effective operation. In each case an auxiliary motor 4 which is in the form of a synchronous motor is used to synchronize the picture drums. This motor is by way of example a La Cour wheel mounted on the driving shaft of the main motor; the control electromagnet 5 of this La Cour wheel receives the necessary synchronizing alternating current from a special thermionic tube generator 6. This generator has only to deliver a very small amount of energy as the synchronous motor fed by it, has only to maintain the phase position of the picture drum drive. Its frequency can therefore be maintained extraordinarily constant, especially if other available means are used to maintain constancy of frequency, in any case it operates on the synchronous motors 4, 5, through reaction free couplings.

A reaction free connection is by example by neutralizing the amplifier valves 7 and 8 by the condensers 9 and 10.

In order to estimate, that synchronism between the rotation of the picture drum or again the La Cour wheels and the frequency of the generator 6, is established, a stroboscopic indicator, for instance the glow discharge lamp 11 which is connected in parallel to the electromagnet 5 in the alternating current circuit, and lights up the teeth of the La Cour wheel, may be used.

The picture light and dark translation at the sending station may be effected for instance by the light rays coming from the source of light 12 acting on the photoelectric cell 13 after reflection at the picture surface, the currents from which cell modulate the sender 15 through an amplifier 14.

At the receiving station the oscillations from the receiving aerial 17 are taken up by the receiver 18. The picture operating currents pass over low frequency amplifiers 19 to a light operated relay 20, such for instance as a Kerr cell, by which means the intensity of light emitted by a source of light 21 is controlled.

By means of the aforementioned thermionic tube generators 6 in combination with the synchronous motors 4, 5 etc., both sender and receiver can be locally maintained in synchronism throughout the time of sending of a picture or telegram, or even also throughout the time of sending a series of pictures. In order to secure the agreement of the two phase maintainers, it will be necessary to compare their frequencies and when necessary bring them into coincidence, and this may be effected by transmitting the frequency (or phase) of one generator by wireless or line to the other station and to there compare it with the frequency (or phase) of the generator at that station by known methods, for instance by pendulums, stroboscopically, by rotating mirrors, by a Braun tube giving double deviation (Lissajou figures of both frequencies) or the like. A simple method of comparison consists in for instance, in imposing both frequencies the local and the remote, simultaneously on a grid of a thermionic electric tube and to then observe the beat notes on the anode circuit of the said tube.

In the arrangement shown in Figure 1 by way of example the frequency of the sending generator 6 is conveyed to the receiving station. For this purpose by way of example, this frequency is taken from the intermediate transformer between the amplifiers 7 and 8 and conveyed to the high frequency sender 15 through switch 22 and modulator 23 so that it arrives at the receiving station as a modulation frequency. A change over switch 24 is provided at the receiving station which when closed upon the contacts 25 of the receiver is connected to the optical relay 20, whilst when closed upon the contacts 26 of the receiver it is connected to the stroboscopical indicator 11, through line 27 and change over switch 28, by which latter this indicator 11 is applied to the local alternating current circuit of the generator 6 by the line 27. By means of the indicator 11 it is possible to then determine whether agreement is established between the frequency transmitted from the sender, and that of the receiving station generator 6. By subsequently regulating the frequency of this latter, complete coincidence may easily be established.

The aforementioned frequency comparison may be undertaken from time to time for instance outside the times of sending pictures. Outside the picture transmission times, the so called "dead picture drum angle" may be used, that is to say that part of its revolution during which no picture element is being transmitted, (in passing the fastening bars securing the picture). During this "dead picture drum angle," the frequency comparison of both local thermionic tube generators, as also the determination of their phase-angle can be effected, by any of the above methods.

The arrangement according to the invention is simplified in those cases where the sign or picture transmitter already includes a thermionic tube generator, which may be used for the production of carrier waves.

In this case the available thermionic tube generator, at the sending station may also be simultaneously used for the production of a synchronizing frequency and thus replace the special synchronizing generator. As its frequency is being constantly transmitted to the other station it can there be compared with the frequency of the synchronizing generator at that station for the purpose of coincidence control. The inventive step of the invention consists in bringing the synchronizing frequency into a definite predetermined adjustable dependency upon the carrier frequency or the picture revolution frequency. Experiments have shown that by average degrees of modulation of the carrier waves with the low frequency to be transferred synchronous running can be effectively secured by one of the following methods.

A convenient apparatus for carrying out the invention is shown in Fig. 2 and constituted as follows:—A thermionic tube generator 6 carefully maintained constant and which gives a basic frequency of for example 1500 Hertzian units or cycles is located at the transmitting station. Its oscillating voltage is used in two ways; firstly, to control, through an amplifier 41, a synchronous motor 4, 5 e. g. a La Cour wheel, driving or maintaining the operation of the moving transmitting apparatus for example the picture transmitting drum 1, and secondly, to amplify, through tuned amplifiers (multistage frequency transformers) 42 and 43 by the known method, of which a typical form of frequency changer is illustrated by Morecroft in "Principles of Radio Communication," 1921 on pages 608 to 613 inclusive, the higher harmonics of the basic frequency of 1500 Hertzian units selective up to the output value which are either radiated directly (after modulation) by aerials or are used further for independent control of a wireless transmitter 15. Thus for example double ten fold amplification of the basic frequency of 1500 Hertzian units is assumed so that a wave corresponding to 150,000 Hertzian units, equivalent to a wave length of 2 km., is radiated. This is previously however modulated with the lower frequencies and amplitudes by means of the modulating device 44, controlled by the picture decomposition arrangement containing the photo-electric cell 13 and amplifier 14.

A constant basic frequency thermionic tube generator 6 is also provided at the receiving station. It will first be assumed that it also supplies exactly the frequency 1500 Hertzian units and thereby in its turn maintains a synchronous motor 4, 5 in operation. The high frequency oscillations in the receiving aerial and controlled by the generator 6 of the sending stations, being caused to interfere with the corresponding high harmonic of the generator 6 at the receiving station and that the oscillation frequency of the latter is so regulated by hand or by mechanical or electrical devices actuated by suitable frequency indicators, that no difference in frequency, (or one which is definite and invariable), exists between the high frequency received, on the one hand and the high frequency produced locally by multiplication on the other hand. The case when the frequency difference (beat note) must be zero occurs when the frequency of the generator at the receiving station, similarly as that of the transmitter, is to be multiplied one hundred times. It is preferable however in many cases to work with a constant and preferably audible, frequency difference. For this purpose the generator 6 in the receiver may be given a slightly different basic frequency and the number of teeth on the La Cour's wheel 4 controlled by it, similarly as at the transmitting end, by the amplifier 41, is accordingly different from the number of the teeth of the sender wheel 4 so that the two mechanisms have the same velocity of revolution. This could also be effected by a gear transmission being chosen for the receiving picture drum slightly different to that at the transmitter. The following method is however to be preferred. The constant basic frequency of 1500 Hertzian units is given to both generators 6 but it does not cause altogether a multiplication by 100 by means of the selective amplifiers (multistage frequency transformers) 42, 43, but one differing by a small multiple therefrom, thus for example a 99 times multiplication by selecting the 11th and 9th harmonics in the cascade arrangement 42, 43. The generator 6 at the receiver must then be so regulated that when working correctly the frequency difference of 1500 Hertzian units is indicated as follows and the generator 6 is brought back to this frequency difference whenever it may vary therefrom.

A very suitable method of indication, which is accordingly shown in the drawings as an example, operates stroboscopically in the following manner, the received high frequency of 100×1500 Hertzian units, amplified by the high frequency amplifier 45, is mixed with the locally multiplied frequency of 99×1500 Hertzian units and the beat note of the frequency 1500 set up in the anode circuit of a rectifying thermionic tube 47 are used to illuminate a suitable inertia free source of light e. g. a glow discharge lamp 11 or a Kerr-cell light controlling device or the like. The beam of light from 11 falls on a symmetrical figure or mark (slot, mirror &c) arranged on a disc 48 rotating with the velocity of revolution of the La Cour wheel 4. As long as the illuminated mark is at rest, there is synchronization, as can be easily understood. Immediately there is a difference between the generators 6 however, the frequency of illumination of the stroboscopic mark on 48 varies greatly and it appears to move or dissolve. The tuning of the generator 6 at the receiver must then be suitably corrected by hand by changing the capacity in the oscillation circuit of generator 6 or by an automatic device reacting to the variation in frequency to accomplish a like result until the mark is again at rest in its initial position. As it is easy to maintain the tuning of the thermionic tube generator constant to one in 100,000 even for long periods using the means mentioned, only very slow variations in its frequency are to be expected so that hand regulation is usually sufficient.

For picture transmission, the apparatus described above must be completed by a detector 18, low frequency amplifier 19 for the picture decomposition frequencies, and finally by a light control cell 20 and a light source 21.

It is obvious that transmission can also be carried out by line transmission by the above method if suitably lower basic and carrier frequencies are selected:

The carrier frequency can be obtained in another way for picture transmission and television by analyzing the transmitted picture by means of a beam of light and a selenium or photo-cell in that the beam of light itself may be weakened or cut off in unison with the carrier frequency to be produced. This may be effected for example, by an electrical light controlling apparatus e. g. a Karolus type of Kerr-cell arranged as shown by Fig. 4, which reduces the intensity of or cuts off the beam of light at intervals regulated by an electrical alternating voltage set up by a thermionic tube generator similar to generator 6 shown by Figs. 1 to 3.

In order to be able to use in a simple manner the carrier frequency controlling the synchronous operation, for the picture transmission by way of modulation of this carrier frequency instead of generating a relatively low carrier frequency by interrupting or weakening the beam of light analyzing the picture, a frequency may be used which is produced electrically in the usual manner and which determines at the same time the velocity of revolution of the transmitter which frequency becomes the carrier frequency by introducing it at a suitable point in the cascade of amplification, which amplifies the picture decomposition frequencies, for example as a high frequency feeding voltage of the photo cell, or as a high frequency grid voltage of a thermionic tube. The advantage of such a method is that both the carrier frequency and the modulation are produced electrically by the photo-electric cell so that one and the same amplifier alone is required. The degree of modulation is given independently of the electrical adjustment of the amplifier or thermionic tube.

In Figure 3, one arrangement for carrying this out is shown. Similar reference letters apply to those parts of the arrangement of Figure 2 used in this arrangement. At the sending station the thermionic tube generator 6 only provides the synchronizing frequency for feeding the synchronous motors 4, 5. A perforate disc or chopper 49 is driven from the picture drum drive, the perforation pitch circle 50 of which lies in the light path of the light source 12 and intercepts the light beam at such a frequency that a suitable carrier frequency is produced in the photo-electric cell 13. This frequency is then modulated according to the light intensity of the picture elements, and is then passed through amplifier 14 to the transmission line 51, by which it is passed to the receiver. The receiver may be for instance of similar construction to the receiver of Figure 2, but the frequency will be otherwise selected. For instance, if the two thermionic tube generators 6 produce a frequency of 500 Hertzian units, and if the driving gear connection for the perforate disc 49 and the number of holes 50 is chosen so that the carrier frequency is 2000 Hertzian units, then the frequency of the generator 6 at the receiver will be tripled, so that a local frequency of 1500 Hertzian units is mixed with the transmitted frequency of 2000 Hertzian units in the circuit 46, and thereby again a beat note of 500 Hertzian units will operate on the stroboscopic indicator 11 and come into comparison with the basic frequency of 500 of the generator 6 by which the picture drum drive is maintained running.

The synchronization of the transmitter and receiver is in this case effected according to the invention by the velocity of revolution of the perforated disc or sector shutter supplying the carrier frequency depending rigidly in suitable ratio upon the velocity of revolution of the picture drum or other picture decomposing apparatus. The same applies when the interruption of the beam of light is obtained by a Kerr-cell or the like from a rotary alternating current machine (high frequency machine). If a thermionic tube transmitter is used for the electrical control of the Kerr cell, the frequency of the same must be controlled and fixed by mechanical coupling to the axis of the picture drum or vice versa. In all the cases considered above in which the carrier frequency is produced of such a pitch, by interrupting or weakening the decomposition light at the transmitting end or even by a direct electrical method (sound generator) that without any further arrangements, it may be used for a La Cour wheel or other synchronous motor, then at the receiving station the synchronization can be effected by local amplification of the carrier frequency and using the same either directly to maintain in operation a synchronous motor operating the receiving apparatus or indirectly for stroboscopic, acoustic or other type of control, effected by known means, of a local thermionic tube generator, maintained constant, which in turn maintain in operation the synchronous motor actuating the receiving apparatus. The latter method requires less amplification of the incoming carrier frequency as its load is only that required for controlling purposes without great expenditure of energy.

By Fig. 4 of the drawing I have shown an arrangement somewhat similar to Figs. 2 and 3 with the exception that the carrier frequency is produced by continually varying the potential upon the plates of a Kerr cell 60 by connecting the said plate to the generator 6 through the frequency changers 42 and 43. As in Figs. 2 and 3, light from the source 12 passes through a shield or diaphragm 63, which regulates the amount of light passing from the source 12, and is directed through a lens of any appropriate character to a nicol prism 62 where the light is polarized in one plane. From nicol prism 62 the light is directed between the plates of the Kerr cell 60 from which the plane polarized light beam after being subjected to the varying potentials is directed through a second nicol prism 61, placed at right angles to the prism 62, so that, in the absence of potential applied to the plates of the cell 60, light will not pass beyond the second nicol 61. However, when potential is applied the plates of the cell 60 the plane polarized beams reaching the nicol prism 61 are changed in character, since if the plane polarized beam is considered as of two components, one vertical and one horizontal, the vertical component is forced to speed up with respect to the horizontal with the effect that the plane of polarization is changed, or as has been frequently expressed, the plane polarized beam is electrically polarized, and light passes beyond the nicol 61. From nicol prism 61 the issuing light passes through a lens to the photo cell 13 where it reaches the negative or other picture to be transmitted placed upon the drum 1. The light reaching the picture may then influence the photo cell 13, preferably by reflection, in a similar manner to that described in connection with the disclosure of Figs. 1, 2, and 3. The remaining parts of Fig. 4 are substantially the same as Fig. 2 and when Fig. 4 is considered in the light of the description of Fig. 2, it is believed that further description will be unnecessary, since the difference over Fig. 2 consists in the way the carrier frequency is produced.

The methods of carrying out the invention described above are only characteristic of the principle of the invention and are capable of many variations and it is within the spirit and scope of my invention to construe this invention broadly to have it cover all forms of modifications that fall reasonably within a scope and such modifications as could be readily developed by a person skilled in the art to which the invention relates.

Having now described my invention, I am entitled to all modifications thereof such as fairly fall within its spirit and scope as defined by the following claims, wherein I claim:

1. In combination with a picture transmission and reception apparatus, a transmitting station and receiving station, picture carrying drums located at each of said stations, a driving motor for each of said drums, independent thermionic tube generators at each station for driving and controlling said motors, means at said transmitting station for converting a light beam into a carrier frequency, means for modulating said carrier in accordance with picture intensities, means for transmitting and receiving said modulated carrier, means at said receiving station for stroboscopically indicating variations in speed between the picture drums of said transmitter and said receiver, and means for reproducing a picture at said receiver in accordance with said received modulated carrier.

2. In combination with a picture transmission and reception apparatus, a transmitting station and a receiving station, a drum carrying the picture to be analyzed located at said transmitting station and a drum upon which a transmitted picture is to be reproduced located at said receiver station, a driving motor for each of said picture drums, independent thermionic generators located at said transmitting and said receiving stations for independently maintaining the speed of said motors constant and equal, a Kerr cell located at said transmitting station, means for applying the frequency of said generator at said transmitter to the plates of said Kerr cell whereby a carrier frequency may be produced by controlling the amount of light passing between the plate of said Kerr cell due to variations in potential applied thereto periodically interrupting light passing therethrough, means for modulating said carrier in accordance with the light intensities of said analyzed picture, means for transmitting and receiving said modulated carrier, means located at said receiver stroboscopically indicating the variation in speed between the said receiver motor and the said transmitter motor, a Kerr cell located at said receiver, and means associated with said Kerr cell for reproducing a picture at said receiver in accordance with said received modulated carrier.

3. In an arrangement for transmitting and receiving pictures, a transmitting station including a drum for carrying a picture to be analyzed and a motor for driving said drum, a receiving station including a drum for carrying a surface for reproducing a picture in accordance with impulses transmitted from said transmitting station, and a motor for driving said drum, a tube generator located at each of said stations, means associated with each of said tube generators for controlling the speed of said motors, a light source located at each of said transmitting and said receiving stations, and a Kerr cell associated with each of said light sources, means for applying the frequency of said transmitter generator upon said Kerr cell at said transmitting station whereby said cell is subjected to potentials varied in accordance with said generator frequency and the amount of light passing therethrough controlled in accordance with said generator frequency, said Kerr cell being located in the path between said light source and said picture carrying drum, means provided by said interruption of light directed to said picture carrying drum through said Kerr cell for producing a carrier frequency, a photo cell located adjacent transmitting drums, means for subjecting said cell to varying light intensities reflected upon said picture and modulating said carrier frequency, means for transmitting and receiving said carrier in modulated form, means at said receiving station for applying varying potentials to the plates of said receiver Kerr cell in accordance with said received carrier for reproducing a record in accordance with the potentials applied to said cell, means at said receiving station for visibly and stroboscopically indicating variations in the speed of said receiver motor and that of said transmitting station motor, and means provided by said visible stroboscopic indication of said differences in speed for manually altering the frequency of the said generator at said receiving station and thereby bring said motors into synchronism.

4. In a radio transmitting system, a transmitter, a picture carrying surface, a light source for directing light upon said picture carrying surface, a Kerr cell interposed in the path of said light from said source to said picture carrying surface, means for producing a radio frequency, means for applying said radio frequency to the plates of said Kerr cell for periodically interrupting the light passing through said cell to said picture surface at a radio frequency and influencing said picture surface at a radio frequency, a transmitter, a photo cell subjected to said radio frequency interrupted light passing through said Kerr cell for transferring said carrier to said transmitter, said cell also being controlled by light intensities of said light reaching said picture surface, and means provided by said photo cell for modulating said light interrupted carrier by the intensity of light and shade in said picture.

5. A picture transmitting system including, means for generating radio frequency oscillations, a Kerr cell, means for applying said radio frequency oscillations to the plate of said Kerr cell whereby the potential and the plate of said cells is varied at a radio frequency, a light source, means for directing the light issuing from said source between the plate of said Kerr cell whereby said light is controlled by the potential applied to said Kerr cell, a picture carrying surface interposed in the path of the light rays issuing from said Kerr cell, a photo cell controlled by said light varied in accordance with the intensities of light and shade in said picture, means for subjecting said photo cell to the light rays interrupted at a radio frequency, means provided by said photo cell for modulating said radio frequency light interrupted beams flowing through said cell by the intensity of light and shade in said picture carrying surface, and means for transmitting said modulated radio frequency carrier.

6. In a picture transmitting system, a transmitter, a picture carrying surface, a photo cell associated with said transmitter, a radio frequency generator, a Kerr cell, means for producing a light beam and directing the said beam between the plates of said Kerr cell to said picture surface, means for applying said generated radio frequency to the plates of said Kerr cell whereby the light passing through said cell is controlled at a radio frequency and the said radio frequency is converted into a radio frequency interrupted light beam whereby currents flowing in said photo cell and transmitter circuit are interrupted at a radio frequency and means provided by said light reaching said picture surface for modulating said radio frequency currents flowing through said photo cell by the varying intensities of light and shade in said picture surface.

In testimony whereof I affix my signature.

AUGUST KAROLUS.